United States Patent [19]
Guevel et al.

[11] Patent Number: 4,810,575
[45] Date of Patent: Mar. 7, 1989

[54] FIBROUS MATERIAL RESISTANT TO THE COMBINED ACTION OF HEAT AND PRESSURE

[75] Inventors: Jean Guevel, Viriat; Marc Francois, Ecully; Guy Bontemps, Tenay, all of France

[73] Assignee: S. A. Schappe, Charnoz, France

[21] Appl. No.: 17,337

[22] Filed: Feb. 20, 1987

[30] Foreign Application Priority Data

Mar. 11, 1986 [FR] France .................. 86 03858

[51] Int. Cl.$^4$ .................. B32B 5/16; B32B 9/00; D02G 3/00
[52] U.S. Cl. .................. 428/357; 428/240; 428/242; 428/297; 428/327; 428/328; 428/359; 428/373; 428/374

[58] Field of Search .............. 428/240, 242, 297, 327, 428/328, 359, 373, 374, 357

[56] References Cited

U.S. PATENT DOCUMENTS 3,956,564  5/1976  Hillig ................. 428/375
4,320,823  3/1982  Covaleski ............. 428/241

*Primary Examiner*—Sharon A. Gibson
*Attorney, Agent, or Firm*—Browdy & Neimark

[57] ABSTRACT

Fibrous material comprising an intimate mixture of polybenzimidazole fibers and alloy fibers having a nickel base. The fibrous material further optionally includes high modulus aromatic polyamide fibers. This fibrous material can be used for making packings, protective clothing and protective screens.

6 Claims, No Drawings

FIBROUS MATERIAL RESISTANT TO THE COMBINED ACTION OF HEAT AND PRESSURE

FIELD OF THE INVENTION

The present invention relates to a fibrous material resistant to the combined action of heat and pressure.

BACKGROUND OF THE INVENTION

Therre is now a considerable demand in the industrial field for technical fibers which are able to resist both high temperature, on the order of 450° C., and the action of aggressive chemical products.

Some uses, particularly in the field of packings, also call for having elements resistant to high pressures, on the order of 400 bars.

At present, these packings are most often made from molded expanded graphite elements, but this is a burdensome solution. In addition, packings made of asbestos fibers cause problems of atmospheric pollution.

SUMMARY OF THE INVENTION

The object of this invention is to provide a new fibrous material able to resist high pressure and temperature stresses, as well as the corrosive action of numerous chemical products.

The fibrous material according to the invention is characterized in that it consists essentially of an intimate mixture of polybenzimidazole fibers and metal alloy fibers with a nickel base.

Preferably fibers are used which are obtained by breaking of wires produced by drawing a metal alloy with nickel base marketed under the trademark INCONEL by the International Nickel Company.

DETAILED DESCRIPTION OF THE INVENTION

According to a preferred embodiment of the invention, the fibrous material consists essentially of about 70% of polybenzimidazole fibers and about 30% of alloy fibers having a nickel base.

A certain amount of high modulus aramid aromatic polyamide is advantageously added to the mixture according to the invention to improve the mechanical properties. This amount is between 15% and 50% by weight calculated in relation to the total weight of the mixture.

The polybenzimidazole fiber is advantageously obtained by breaking of filaments with an average height of fibers of 110 mm. The nickel alloy fiber is also obtained by breaking of wires drawn to a height of 120 mm, the intimate mixture being achieved on long-fiber spinning equipment.

This transformation of the continuous filaments is performed according to a controlled stretch breaking process; it is performed on multifilament cables of single fibers, whose count is between 0.8 and 6 tex, as mentioned above. Thus long fibers are obtained which make it possible to spin a very wide range of counts between 1/1 (1000 tex) and 200/1 (5 tex).

Complementary finishing operations, such as twisting and cabling, can then be performed.

The nickel base alloy, a chemically inert refractory material, so far has never been used in the textile field, and its transformation into fibers by the stretch breaking process allows its use in the fibrous material according to the invention in quite surprisingly high proportions.

The fibrous material thus obtained has numerous applications.

Thus, in the form of braided and carded yarns, it can be used in packing boxes, in packings able to support pressures up to 400 bars and temperatures up to 450° C.

It also has interesting uses in the field of clothing for protection from heat and chemical products.

It can also be used, in the form of woven screen, as flexible or rigid screens for protection from thermal fluxes, as matrix reinforcement.

The foregoing description of the specific embodiments will so fully reveal the general nature of the invention that other can, by applying current knowledge, readily modify and/or adapt for various applications such specific embodiment without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. A fibrous composition comprising an intimate mixture of polybenzimidazole fibers and INCONEL fibers in relative amounts sufficient to resist chemical attack and temperatures on the order of 450° C.

2. A fibrous composition according to claim 1, comprising about 70% of polybenzimidazole fibers and about 30% of INCONEL.

3. A fibrous composition according to claim 1, wherein there is added to the mixture an amount of high modulus aromatic polyamide fibers in proportions between 15% and 50% by weight of the total weight of the mixture.

4. A fibrous composition according to claim 1, wherein the polybenzimidazole fiber is obtained by breaking of filaments at an average height of fibers of 110 mm and the INCONEL is obtained by breaking of drawn wires at an average height of 120 mm.

5. A fibrous composition comprising an intimate mixture of polybenzimidazole fibers in an amount on the order of about 70% by weight and nickel alloy fibers in an amount on the order of about 30% by weight.

6. A fibrous composition according to claim 5 further comprising 15–50% by weight, based on the total weight of said composition, of high modulus aromatic polyamid fibers.

* * * * *